United States Patent [19]
Shimada et al.

[11] Patent Number: 5,853,349
[45] Date of Patent: Dec. 29, 1998

[54] SHIFT CONTROL METHOD FOR AUTOMATIC TRANSMISSION

[75] Inventors: Takamichi Shimada, Sakado; Noboru Sekine, Kasukabe, both of Japan

[73] Assignee: Honda Giken Kogyo Kabushiki Kaisha, Tokyo, Japan

[21] Appl. No.: 775,928

[22] Filed: Jan. 2, 1997

[30]   Foreign Application Priority Data

Jan. 8, 1996 [JP] Japan .................................. 8-000392

[51] Int. Cl.$^6$ .......................... F16H 61/06; F16H 61/08
[52] U.S. Cl. .......................................... 477/143; 477/155
[58] Field of Search .................................. 477/143, 154, 477/155

[56]   References Cited

U.S. PATENT DOCUMENTS

| 4,707,789 | 11/1987 | Downs et al. | 477/154 X |
| 4,982,620 | 1/1991 | Holbrook et al. | 74/731.1 |
| 5,062,321 | 11/1991 | Koenig et al. | 477/155 |
| 5,072,390 | 12/1991 | Lentz et al. | 477/154 |
| 5,551,930 | 9/1996 | Creger et al. | 477/143 |

FOREIGN PATENT DOCUMENTS

| 0 435 377 | 12/1990 | European Pat. Off. . |
| 5-17976 | 3/1993 | Japan . |

OTHER PUBLICATIONS

2244 Research Disclosure, (1994) Mar., No. 359, Emsworth, GB, p. 150.

2244 Research Disclosure, (1994) Mar., No. 359, Emsworth, GB, p. 142.

*Primary Examiner*—Charles A. Marmor
*Assistant Examiner*—Sherry Lynn Estremsky
*Attorney, Agent, or Firm*—Nikaido, Marmelstein, Murray & Oram LLP

[57]   ABSTRACT

A control for shifting from an off-going speed range to an on-coming speed range comprises an off-going range releasing stage, an on-coming range void-stroke-clearing stage, an on-coming range engaging stage and an on-coming range final stage. During the off-going range releasing stage, an off-going engaging element is released in response to a shift command signal. During the on-coming range void-stroke-clearing stage, the engagement-actuation pressure of the on-coming engaging element is set at a predetermined high-pressure for a predetermined time period after the shift command signal is generated, whereby the void stroke of the on-coming engaging element is cleared. During the on-coming range engaging stage, after the completion of the on-coming range void-stroke-clearing stage, the on-coming engaging element is engaged. During the on-coming range final stage, following the on-coming range engaging stage, the on-coming engaging element is engaged completely. In this control, based on the condition of the engaging operation of the on-coming engaging element during the on-coming range engaging stage, the predetermined time period for the on-coming range void-stroke-clearing stage is corrected for a next shift operation.

5 Claims, 13 Drawing Sheets ically to a shift control
method for controlling oil pressure which actuates an
on-coming engaging element for a shift operation in an
automatic transmission used in a vehicle, and particularly to
a shift control method in which a smooth shift is realized by
correcting the time required for clearing the void stroke of
the on-coming engaging element during the shift operation.

BACKGROUND OF THE INVENTION

Automatic transmissions are composed of a plurality of
gear trains. For shifting the speed, these gear trains establish
a plurality of power transmission paths, which are selected
by hydraulically actuating some engaging elements such as
a clutch and a brake. While the transmission is being shifted,
an engaging element establishing the power transmission
path for an off-going speed range (off-going engaging
element) is released, and another element (on-coming
engaging element) is engaged to establish the power transmission path for an on-coming speed range.

In order to execute such shifts smoothly without any lag,
engagement and disengagement of the engaging elements
are precisely timed, and forces applied to these engaging
elements for engagement and disengagement are properly
controlled. When oil is supplied to an on-coming engaging
element for a shift, the hydraulic pressure applied to it
should be kept low during its initial stage to smooth the shift.
However, if a low pressure is applied from the beginning of
the shift operation, it takes a relatively long time for the oil
paths and actuation cylinders connected to the on-coming
engaging element to be filled with oil (i.e., it takes a
relatively long time for the piston of the actuation cylinder
to clear its void stroke for the engaging operation). Thus,
actual actuation of the on-coming engaging element is
delayed, and a problem of shift lag is experienced.

In a conventional shift control, the following is often
practiced to achieve a smooth shifting without any lag.
Immediately after a shift command is generated, a maximum
pressure is supplied to the on-coming engaging element to
clear the void stroke quickly (process of filling the oil paths
and actuation cylinders which are connected to the
on-coming engaging element with oil). When the on-coming
engaging element actually starts engaging, the actuation
pressure is reduced to a lower pressure.

For example, Japanese Patent Publication No. 5(1993)-
17976 (which corresponds to U.S. Pat. No. 802676) discloses a shift control apparatus which controls the supply of
oil to an on-coming clutch in stages during shift operation.
During a preparation stage, the clutch is filled with oil, i.e.,
the void stroke is cleared. During a completion stage, the
clutch is gradually engaged.

In this apparatus, a method of control is disclosed in
which the time period after the beginning of the preparation
stage until the detection of a change in the input speed (i.e.,
the time actually spent for clearing the void stroke:
IPDELAY) is compared with a standard time
(DESDELAY), and basing on the difference between them,
the time tm for performing the preparation stage is corrected
for a next shift operation.

In summary, it can be said that a standard time is preset
for clearing the void stroke of an on-coming clutch (on-coming engaging element) in this control. If the actual time
spent for clearing the void stroke is shorter than this, then the
filling of oil is judged as insufficient, and the preparation
stage is controlled to take a longer time in a next shift
operation.

However, the condition of an on-coming clutch (on-coming engaging element) before starting the engaging
operation is not always the same. It is different every time,
and it changes with elapse of time. Changes affect the setting
of an optimal time for clearing the void stroke, so it is
difficult for the above described control to correct the time
for clearing the void stroke for a next shift operation by
learning from the actual time spent for the clearing (i.e., the
time indicated by "IPDELAY" in the above publication).

This void stroke clearing is a process which is carried out
before the clutch achieves complete engagement and does
not reflect the condition of the engaging operation of the
clutch. Therefore, it is impossible to set the time for clearing
the void stroke in correspondence with the condition of the
clutch engagement.

SUMMARY OF THE INVENTION

It is an object of the present invention to provide a shift
control method for an automatic transmission which sets an
optimal time for an on-coming engaging element (clutch) to
clear the void stroke in correspondence with the condition of
the engaging operation of the on-coming engaging element,
thereby enabling a smooth shift with the condition of the
engaging operation of the engaging element.

In order to achieve this object, a shift control method of
the present invention comprises an off-going range releasing
stage, an on-coming range void-stroke-clearing stage, an
on-coming range engaging stage and an on-coming range
final stage, for controlling a shift from an off-going speed
range to an on-coming speed range while the off-going
engaging element is released and the on-coming engaging
element is engaged. During the off-going range releasing
stage, the off-going engaging element is released by lowering the engagement-actuating pressure of the off-going
engaging element in response to a shift command signal.
During the on-coming range void-stroke-clearing stage,
which is carried out in parallel with the off-going range
releasing stage, the engagement-actuation pressure of the
on-coming engaging element is kept at a predetermined
high-pressure for a predetermined time period after the shift
command signal is generated, whereby the void stroke of the
on-coming engaging element is cleared. During the
on-coming range engaging stage after the completion of the
on-coming range void-stroke-clearing stage, the on-coming
engaging element is engaged weakly. During the on-coming
range final stage following the on-coming range engaging
stage, the on-coming engaging element is engaged completely. In this control, the predetermined time period set for
the on-coming range void-stroke-clearing stage is corrected
for a next shift operation on the basis of the condition of the
engaging operation of the on-coming engaging element
during the on-coming range engaging stage.

Here, the predetermined time period, i.e., the time period
during which the predetermined high pressure is being
retained, set for the on-coming range void-stroke-clearing
stage is corrected for a next shift operation on the basis of
changes in the rate of slippage of the on-coming engaging
element during the on-coming range engaging stage or on
the basis of the rate of change of the input/output rotational
speed ratio of the on-coming engaging element during the
on-coming range engaging stage. In this case, if the rate of
change of the input/output rotational speed ratio of the on-coming engaging element during the on-coming range engaging stage is smaller than a standard rate of change, the predetermined time period is made longer. On the other hand, if the rate of change of the input/output rotational speed ratio of the on-coming engaging element during the on-coming range engaging stage is greater than the standard rate of change, the predetermined time period is made shorter.

Furthermore, the predetermined time period, i.e., the time period during which the predetermined high pressure is being retained, set for the on-coming range void-stroke-clearing stage may be corrected for a next shift operation on the basis of the operational time of the on-coming range engaging stage. In this case, if the operational time of the on-coming range engaging stage is longer than a standard time period, the predetermined time period is made longer. On the other hand, if the operational time of the on-coming range engaging stage is shorter than the standard time period, the predetermined time period is made shorter.

Here, the on-coming range engaging stage is a stage during which the on-coming engaging element actually engages. The condition of the on-coming engaging element during this stage describes the condition of the engaging operation of the on-coming engaging element. Therefore, the time to be set for clearing the void stroke in a next shift operation can be corrected in correspondence with the condition of the engaging operation of the on-coming engaging element in this shift control method according to the present invention, thus achieving a smooth shift control suited for the operational condition of the engaging element.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DETAILED DESCRIPTION OF THE PREFERRED EMBODIMENTS

Figure 1:
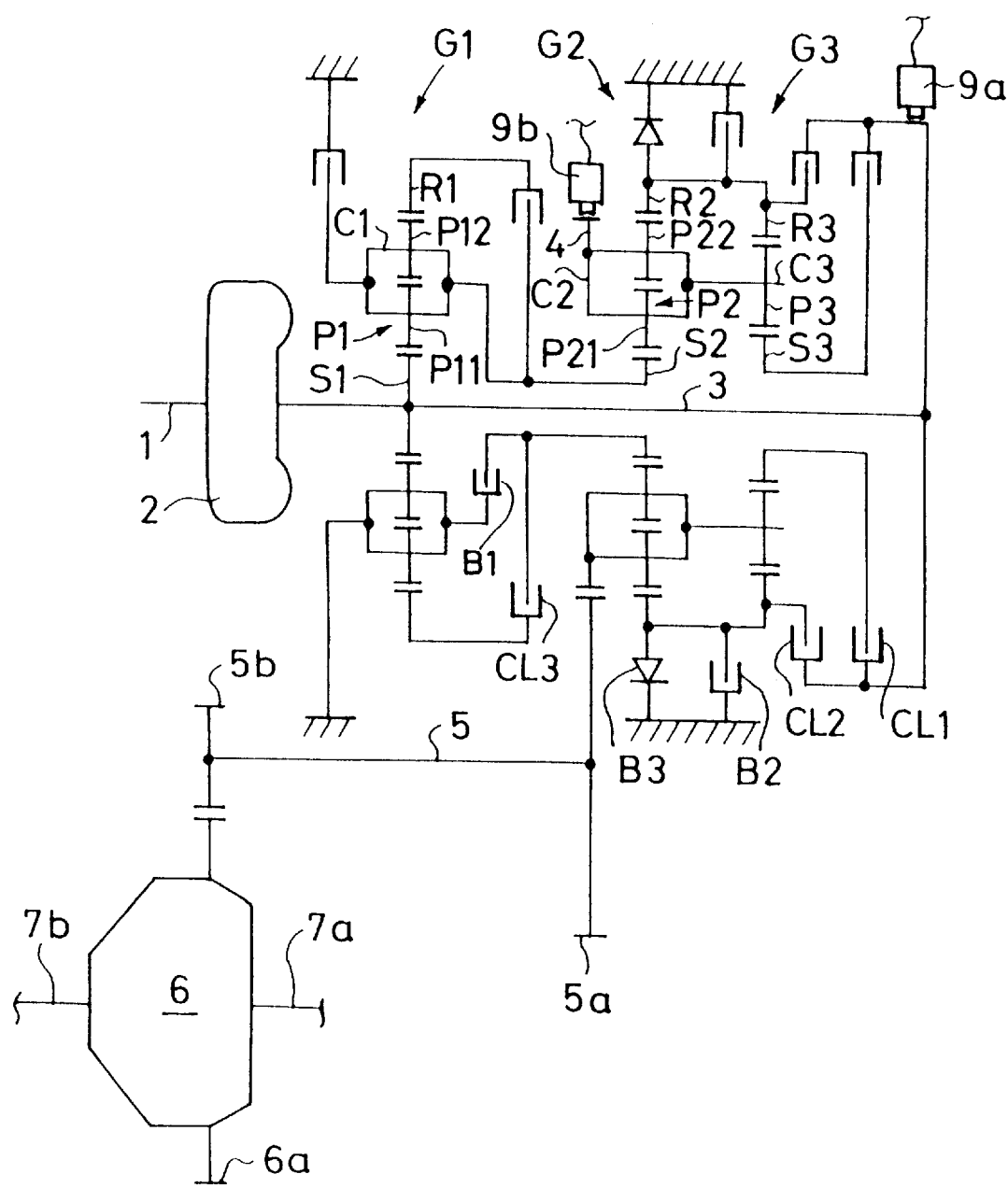
FIG. 1 is a schematic diagram of an automatic transmission which is controlled by a shift control method of the present invention.

FIG. 1 shows a power transmission system for use in an automatic transmission which is controlled by a shift control method of the present invention.

This transmission comprises a torque converter 2 connected to an engine output shaft 1, an input shaft 3 connected to a turbine shaft of the torque converter 2, and a planetary transmission mechanism mounted on the input shaft 3.

The planetary transmission mechanism has first, second, and third planetary gear trains G1, G2 and G3 juxtaposed on the input shaft 3. The first, second, and third planetary gear trains comprise respective first, second, and third sun gears S1, S2 and S3 positioned centrally; respective first, second, and third planetary pinions P1, P2 and P3 in mesh with the first, second and third sun gears S1, S2 and S3, respectively, and revolving therearound while rotating about their own axes; respective first, second, and third carriers C1, C2 and C3 which support the respective planetary pinions P1, P2 and P3 rotatably and rotate therewith around the sun gears S1, S2 and S3, respectively; and respective first, second and third ring gears R1, R2 and R3, whose internal gear teeth mesh with the planetary pinions P1, P2 and P3, respectively.

The first and second planetary gear trains G1 and G2 are double-pinion planetary gear trains. The first and second pinions P1 and P2 comprise two pinions each P11 and P12, and P21 and P22, respectively.

The first sun gear S1 is connected to the input shaft 3 at all times, and the first carrier C1 is fixed and retained to a housing. This first carrier C1 is coupled to the second sun gear S2 through a first brake B1. The first ring gear R1 is engageably and disengageably coupled to the second sun gear S2 through a third clutch CL3. The second carrier C2 is coupled with the third carrier C3 at all times, and they are coupled to an output gear 4 at all times. The second ring gear R2 is coupled with the third ring gear R3 at all times, and they can be held against rotation by a second brake B2. Besides this second brake B2, they are also connected to the housing through a one-way brake B3, thus not rotatable in a forward drive direction. Furthermore, the second and third ring gears R2 and R3 are engageably and disengageably connected to the input shaft 3 through a second clutch CL2, and the third sun gear S3 is engageably and disengageably connected to the input shaft 3 through a first clutch CL1.

Furthermore, input and output rotation sensors 9a and 9b are provided as shown in the figure.

In the above described transmission, shifts of speed ranges are carried out by selectively engaging and disengaging the first, second and third clutches CL1, CL2 and CL3 and the first and second brakes B1 and B2. Specifically, five forward speed ranges (1ST, 2ND, 3RD, 4TH and 5TH) and one reverse speed range (REV) can be established by selectively engaging the clutches and brakes as indicated in Table 1 below.

In the table, the second brake B2 in the 1ST speed range is marked by a circle in parentheses to indicate that the 1ST speed range can be established by the one-way brake B3 with or without the engagement of the second brake B2. This means that when the first clutch CL1 is engaged, the 1ST speed range can be established without the engagement of the second brake B2. However, since the one-way brake B3 does not allow power transmission in the direction opposite to a forward drive direction, no engine brake is available in the 1ST speed range which is established without the engagement of the second brake B2. On the other hand, engine brake is available in the 1ST speed range if it is established with the engagement of the second brake B2. Thus, the 1ST speed range in the forward range D does not allow engine brake.

TABLE 1

| Speed range | CL1 | CL2 | CL3 | B1 | B2 |
|---|---|---|---|---|---|
| 1ST | ○ | | | | (○) |
| 2ND | ○ | | | | ○ |
| 3RD | ○ | | ○ | | |
| 4TH | ○ | ○ | | | |
| 5TH | | ○ | ○ | | |
| REV | | | ○ | ○ | |

Figure 2:
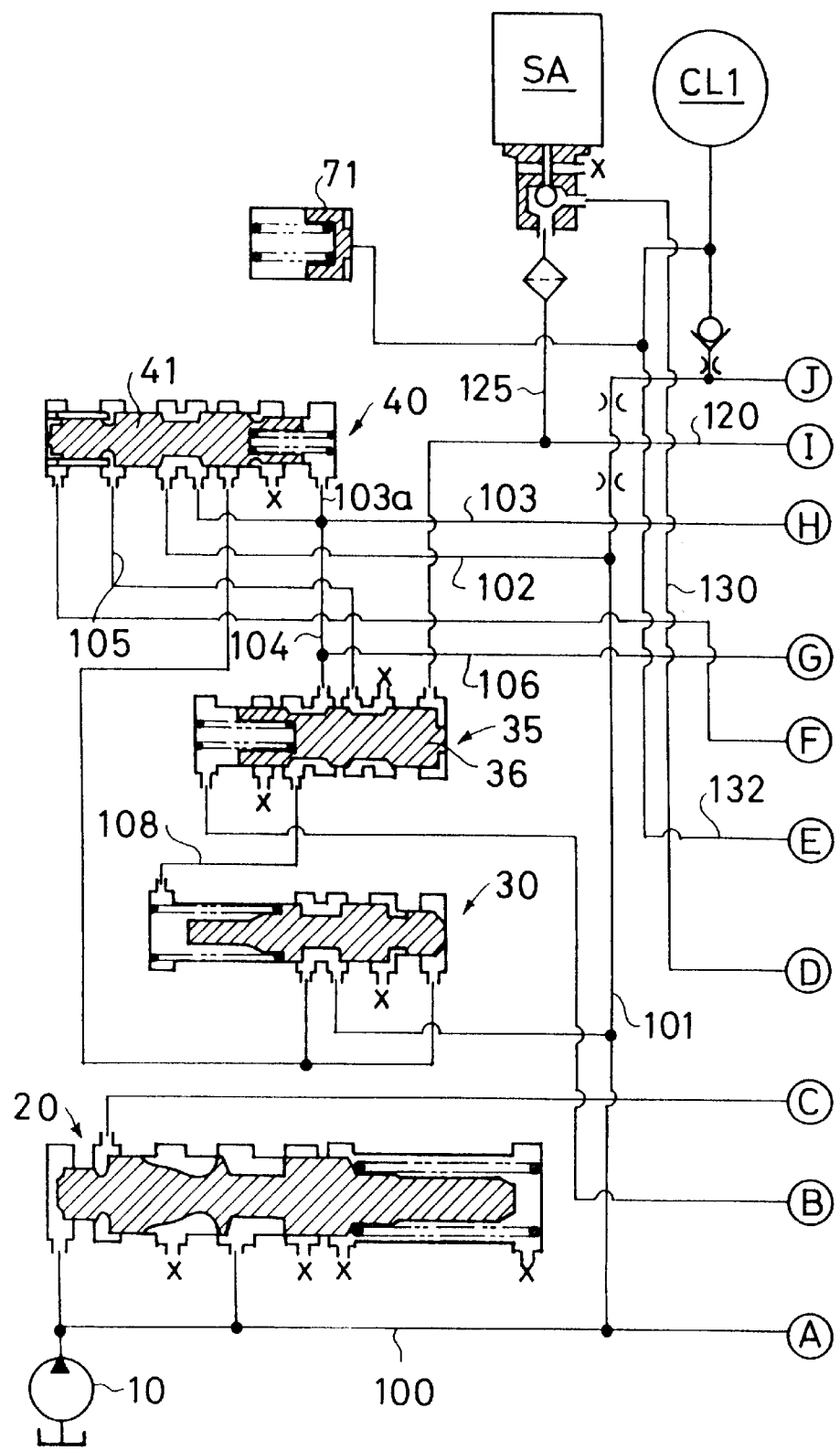
FIG. 2 is a partial hydraulic circuit diagram showing components of a shift control apparatus with which the shift control method is applied.
Figure 3:
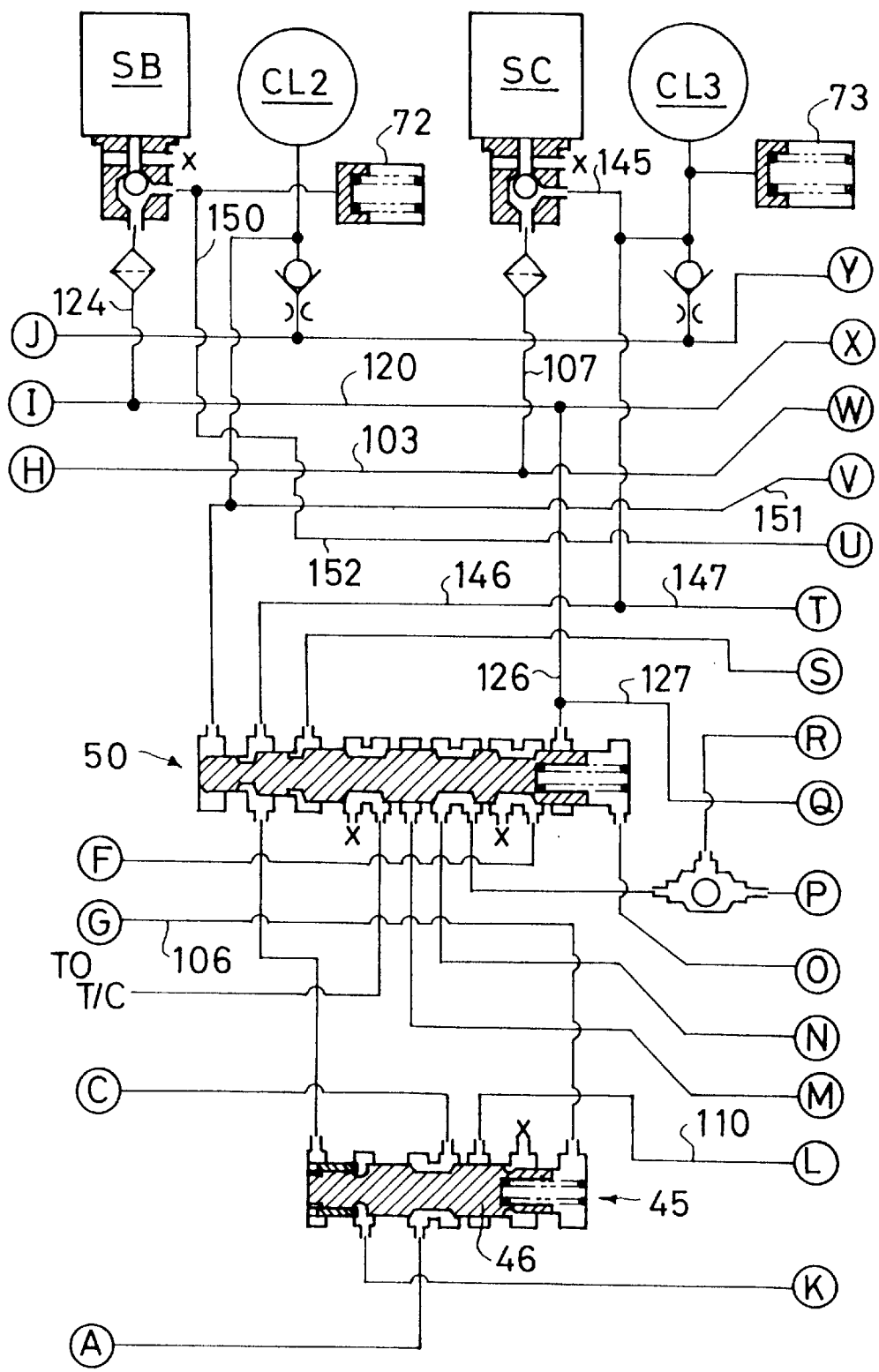
FIG. 3 is another partial hydraulic circuit diagram showing components of the shift control apparatus.
Figure 4:
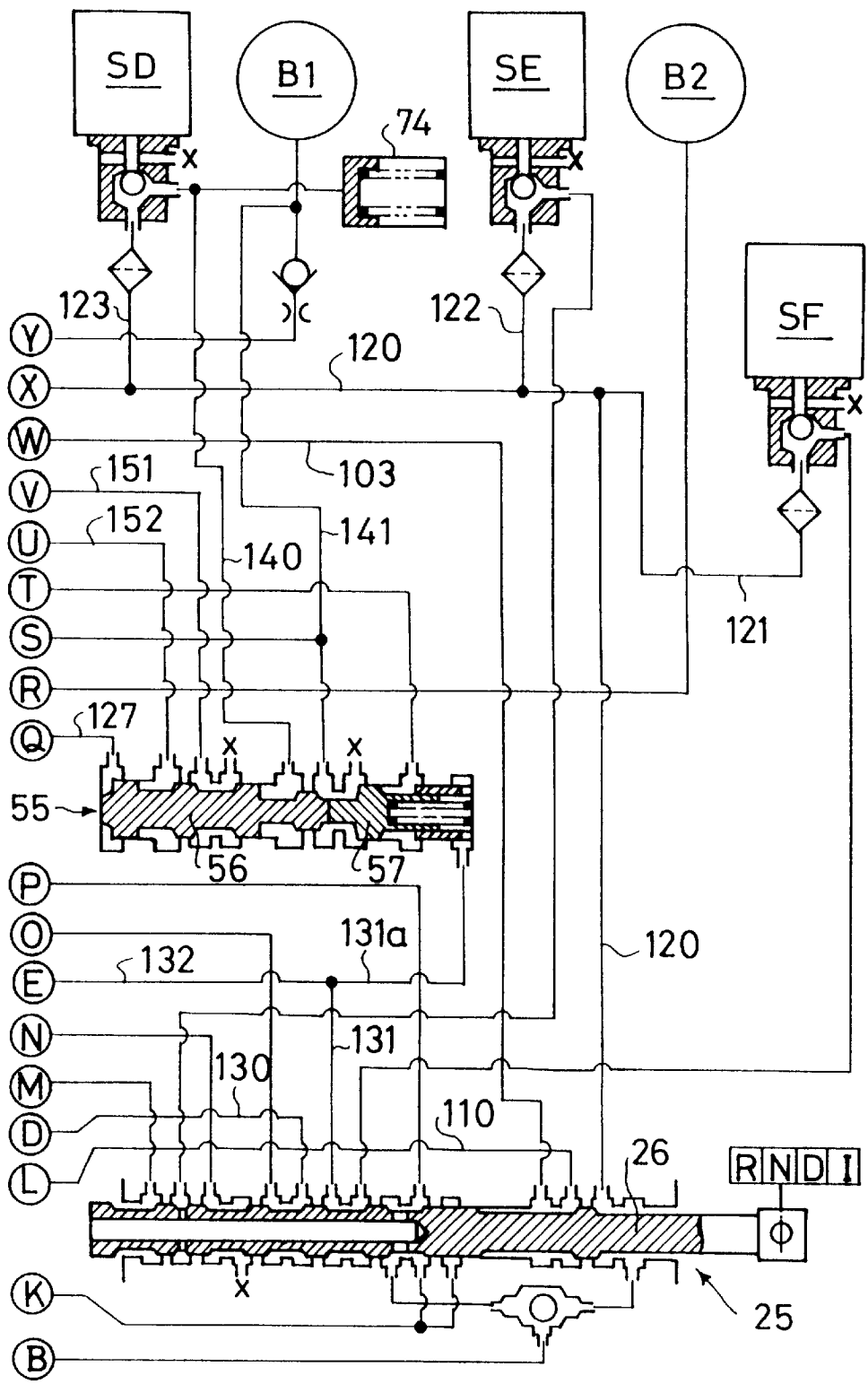
FIG. 4 is yet another partial hydraulic circuit diagram showing components of the shift control apparatus.

With reference to FIGS. 2, 3 and 4, a control apparatus for controlling engagement and disengagement of the first, second and third clutches CL1, CL2 and CL3 and the first and second brakes B1 and B2 will be described below. Each of the three drawings shows a respective portion of the control apparatus, composing a unified hydraulic circuit. Lines terminated with an identical alphabet (A–Y) in a circle in each drawing are continuous to each other, and lines marked with "X" are connected to a drain.

This control apparatus is supplied with working oil by a hydraulic pump 10. This oil is first adjusted to a line pressure P1 by a regulator valve 20 and sent out through a line 100 as shown in the figures.

Besides this regulator valve 20, the control apparatus has a manual valve 25; six solenoid valves SA–SF; six hydraulic valves 30, 35, 40, 45, 50 and 55; and four accumulators 71, 72, 73 and 74. The manual valve 25 is connected to a shift lever near the driver's seat, and it is manually operated by the driver. The solenoid valves SA, SC and SF are normally-open type, so these valves are open while the solenoids are not energized. The solenoid valves SB, SD and SE are normally-close type, so these valves are closed while the solenoids are not energized.

In the following description, valves are each referred to as reducing valve 30, L-H shift valve 35, FWD pressure-switching valve 40, REV pressure-switching valve 45, delivery valve 50, and relief valve 55.

These hydraulic valves are actuated in response to the operation of the manual valve 25 and the solenoid valves SA–SF for the purpose of executing a shift control. Table 2 below shows the relation of the operation of the solenoid valves to the establishment of the speed ranges. "ON" and "OFF" in the table represent the turning on and off, respectively, of the solenoids. The operation of the solenoid valve SF is not shown in the table because it is not used for establishing a speed range but used only for increasing the line pressure when the reverse speed range is established.

TABLE 2

| Speed range | SOLENOID-OPERATED VALVE | | | | |
|---|---|---|---|---|---|
| | SA | SB | SC | SD | SE |
| Type | N/O | N/C | N/O | N/C | N/C |
| 1ST | OFF | OFF | ON | OFF | OFF (ON upon Engine braking) |
| 2ND | OFF | OFF | ON | ON | OFF (ON upon Engagement of L/C) |
| 3RD | OFF | OFF | OFF | OFF | OFF (ON upon Engagement of L/C) |
| 4TH | OFF | ON | ON | OFF | OFF (ON upon Engagement of L/C) |
| 5TH | ON | ON | OFF | OFF | OFF (ON upon Engagement of L/C) |
| REV | OFF | ON | OFF | OFF | OFF |

N/O: Normally-open; N/C: Normally-closed; and L/C: Lockup clutch.

At first, description is given of a shift control which takes place when the D range (forward range) is selected with the shift lever moving a spool 26 in the manual valve 25 from position N, the position of the spool 26 shown in FIG. 4, to position D. When a hook on the right end of the spool 26 is positioned at "D", oil under the line pressure P1 is delivered to the manual valve 25 through lines 101 and 102 branched from the line 100 and then through a spool groove in the FWD pressure-switching valve 40 and a line 103. Then, the line pressure P1 is delivered through a groove on the spool 26 to lines 110 and 120. In this instance, the line 110 is closed off by the REV pressure-switching valve 45.

The oil under the line pressure P1 is then supplied from the line 120 to the solenoid valves SF, SE, SD, SB and SA through branched lines 121, 122, 123, 124 and 125, respectively. The line pressure P1 in the line 120 also acts on the right end of the L-H shift valve 35, moving a spool 36 thereof to the left. A line 126 branching from the line 120 is connected to the right end of the delivery valve 50, and a line 127 branching from the line 126 is connected to the left end of the relief valve 55, whereby spools 56 and 57 in the relief valve 55 are shifted to the right.

A line 103a branching from the line 103 is connected to the right end of the FWD pressure-switching valve 40 such that the line pressure P1 pushes a spool 41 in the FWD pressure-switching valve 40 to the left. The line pressure P1 is supplied to the left end of the FWD pressure-switching valve 40 through a line 104 branching from the line 103, through a groove on the spool 36 in the L-H shift valve 35, which has been shifted to the left, and then through a line 105. A line 106 branching from the line 104 is connected to the right end of the REV pressure-switching valve 45 such that a spool 46 in the REV pressure-switching valve 45 is kept shifted to the left by the line pressure P1.

A line 107 branching from the line 103 is connected to the solenoid valve SC, to supply the line pressure P1 thereto. In the above described ways, the line pressure P1 is supplied to each of the solenoid valves SA–SF, which are controlled to open or close for the purpose of controlling supply of the line pressure P1.

First, establishing the 1ST speed range is described. As the solenoid valve SF is not involved in establishing a forward range, only the solenoid valves SA–SE will be included in the description as shown in Table 2.

With reference to Table 2, only the solenoid valve SC is turned on, and the other solenoid valves are turned off for the 1ST speed range. As a result, only the solenoid valve SA opens, and the other solenoid valves close. When the solenoid valve SA opens, the line pressure P1 is supplied from the line 125 to a line 130 and then to a line 131 through a groove on the spool 26 at position D of the manual valve 25.

A line 131a branching from the line 131 is connected to the right end of the relief valve 55 such that the line pressure P1 acts on the right end of the relief valve 55. Furthermore, the line pressure P1 is supplied to the first clutch CL1 through a line 132 branching from the line 131, whereby the first clutch CL1 is actuated for engagement, and pressure change which occurs in the first clutch CL1 is regulated by the first accumulator 71.

The second clutch CL2 is connected to the drain through the relief valve 55, whose spools 56 and 57 are shifted to the right, and through the solenoid valve SB. The third clutch CL3 is connected to the drain through the solenoid valve SC, and the first brake B1 is connected to the drain through the relief valve 55 and the solenoid valve SD. The second brake B2 is connected to the drain through the manual valve 25. Therefore, only the first clutch CL1 engages to establish the 1ST speed range.

Next, description is made of establishing the 2ND speed range. As shown in Table 2, the solenoid valve SD is turned on, and it opens. As a result, the line pressure P1 is supplied to the first brake B1 from the line 123 through a line 140 and the relief valve 55, whose spools 56 and 57 are shifted to the right, and through a line 141. Therefore, the first clutch CL1 and the first brake B1 engage to establish the 2ND speed range.

For establishing the 3RD speed range, the solenoid valve SC is turned off, and the solenoid valve SD is also turned off. Because the solenoid valve SD is returned to off, the first brake B1 is released. As the solenoid valve SC is turned off and opened, the line pressure P1 is supplied to the third clutch CL3 from the line 107 through a line 145. As a result, the third clutch CL3 engages to establish the 3RD speed range.

At the same time, the line pressure P1 acts on the left-hand portion of the delivery valve 50 through a line 146 branching from the line 145 and also acts on the right end of the relief valve 55 through a line 147 branching from the line 145.

For establishing the 4TH speed range, the solenoid valve SB is turned on, and the solenoid valve SC is also turned on. As the solenoid valve SC is returned to on, the third clutch CL3 is released. As the solenoid valve SB opens, the line pressure P1 is supplied to the second clutch CL2 from the line 124 through lines 150 and 152 and a groove on the spool 56 shifted to the right in the relief valve 55 and through a line 151. As a result, the second clutch CL2 engages to establish the 4TH speed range.

For establishing the 5TH speed range, the solenoid valve SA is turned on, and the solenoid valve SC is turned off. As the solenoid valve SA is switched from off to on, the supply of the line pressure P1 to the line 130 is cut off, and the first clutch CL1 is connected to the drain through the solenoid valve SA. As a result, the first clutch CL1 is released. As the solenoid valve SC opens, the third clutch CL3 engages as described previously. As a result, the 5TH speed range is established.

The clutches and brakes are controlled for engagement and disengagement in the manner described above. Now, a shift control according to the present invention is described.

Figure 5:
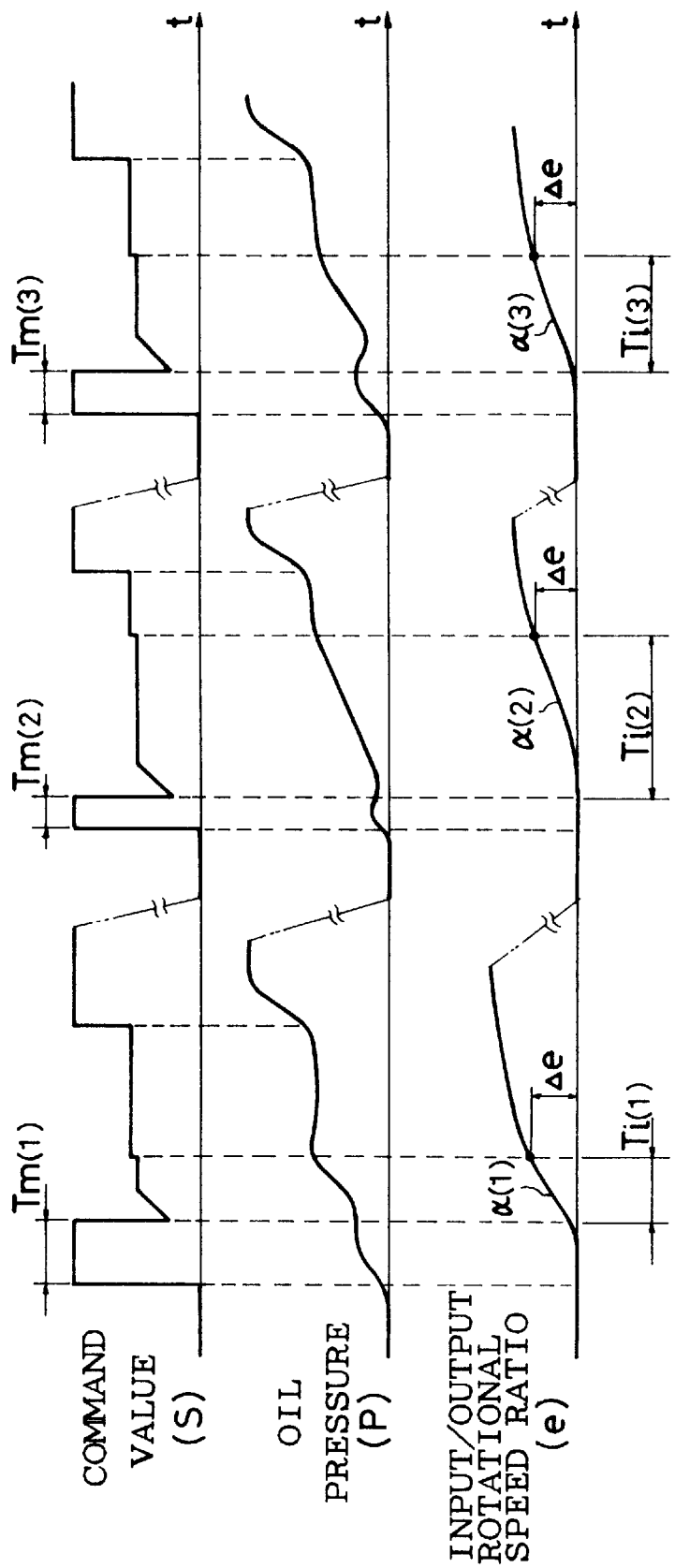
FIG. 5A, 5B and 5C are a timing chart showing changes in a shift command value, actuation pressure and input/output rotational speed ratio while a shift control is carried out in accordance with the shift control method.

A typical example is given in FIG. 5 for describing a control of void-stroke clearing by learning according to a method of the present invention. In the figure, the top row describes command values for supplying pressure to an on-coming engaging element for engagement, i.e., the values for setting the duty cycles of the solenoid valve. The middle row describes changes which actually occur in the pressure of the on-coming engaging element in response to the command values, and the bottom row describes changes in the input/output rotational speed ratio e of the on-coming engaging element, which occur in response to the pressure changes.

As shown in (A) of the figure, in a first shift command, a maximum value is given during a first time period Tm(1), and the pressure of the on-coming engaging element is rapidly increased to clear the void stroke (the cylinder of the on-coming engaging element is filled with oil). After the completion of this stage, i.e., the clearing of the void stroke, the command value is lowered to a predetermined value as shown in the figure. When the on-coming engaging element starts engaging (weak engagement), the input/output rotational speed ratio e starts changing. Here, a calculation is made for the rate of change $\alpha(1)$ of the input/output rotational speed ratio e over a predetermined value $\Delta e$ of change. This rate of change $\alpha(1)$ is compared with a standard rate of change $\alpha S$, and the time period Tm for clearing the void stroke is corrected for a next shift operation on the basis of the result of this comparison.

For example, $\alpha(1) > \alpha S$ in the shift of FIG. 5(A), and the time period Tm(1) for clearing the void stroke is relatively long. In this case, a correction is made to shorten the time, and a new time period Tm(2) for clearing the voidstroke is set and memorized for a next shift operation. This memorized time period Tm(2) is used in the next shift operation shown in FIG. 5(B). This has resulted as shown in the figure.

In the shift operation shown in FIG. 5(B), the rate of change $\alpha(2)$ of the input/output rotational speed ratio e over the predetermined value $\Delta e$ of change after the completion of the void stroke clearing is smaller than the standard rate of change $\alpha S$. Therefore, the time to be set for clearing the void stroke in a next shift operation is corrected longer, and the time period Tm(3) is set and memorized. This corrected time period Tm(3) set for clearing the voidstroke is used in the next shift operation shown in FIG. 5(C).

This has resulted in the rate of change $\alpha(3)$ of the input/output rotational speed ratio e almost equaling the standard rate of change $\alpha S$.

The time period to be set for clearing the void stroke in a next shift operation is corrected by learning from the rate of change of the input/output rotational speed ratio of the on-coming engaging element while it has been actually engaging (in weak engagement) in the above described way. Therefore, an appropriate time period is set for clearing the void stroke in correspondence with the actual condition of the on-coming engaging element (clutch or brake) in the method of shift control according to the present invention. This realizes a stable shift control even if the condition of the on-coming engaging element varies with time because effects of this variation can be also corrected by learning.

In the above described method, the time period set for clearing the void stroke is corrected by learning on the basis of the rate of change of the input/output rotational speed ratio of the on-coming engaging element. However, correction can be also based on the rate of slippage of the on-coming engaging element or on the time spent for the input/output rotational speed ratio to change by the predetermined value $\Delta e$ (i.e., Ti(1), Ti(2) and Ti(3) in FIG. 5) instead of the rate of change.

Figure 6:
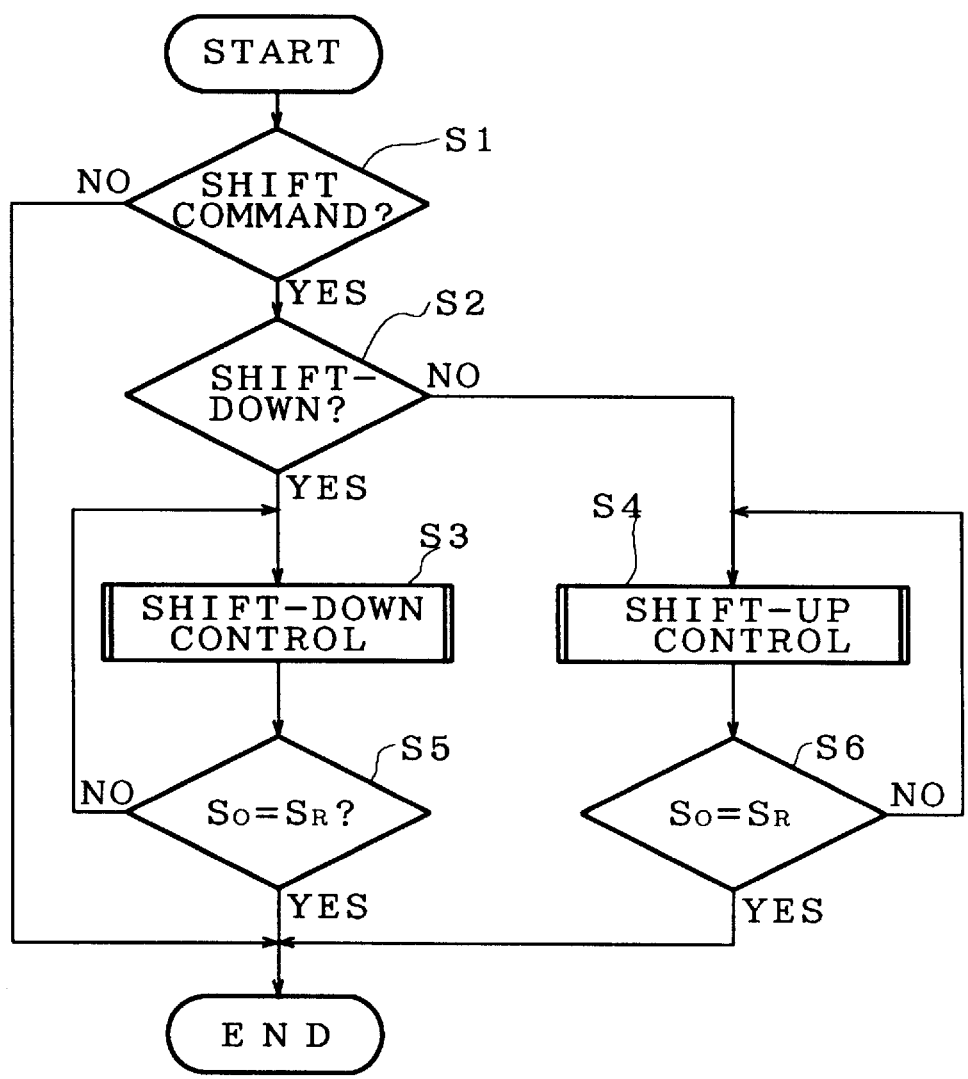
FIG. 6 is a flowchart showing processes effected in the shift control method.

Such a shift control carried out by the method of the present invention is described in detail in the following. The whole processes of this shift control is charted in FIG. 6. In this control, determination is made whether there is a shift command or not at step S1. If a shift command is detected, then determination is made whether it is a shift-up command or a shift-down command at step S2. If it is a shift-down command, then the control flow proceeds to step S3 to carry out a shift-down control. On the other hand, if a shift-up command is detected, then the control flow proceeds to step S4 to carry out a shift-up control. In both shift controls, when the current speed range So equals a target speed range SR at steps S5 and S6, i.e., the shift is judged complete, the controls end.

Figure 7:
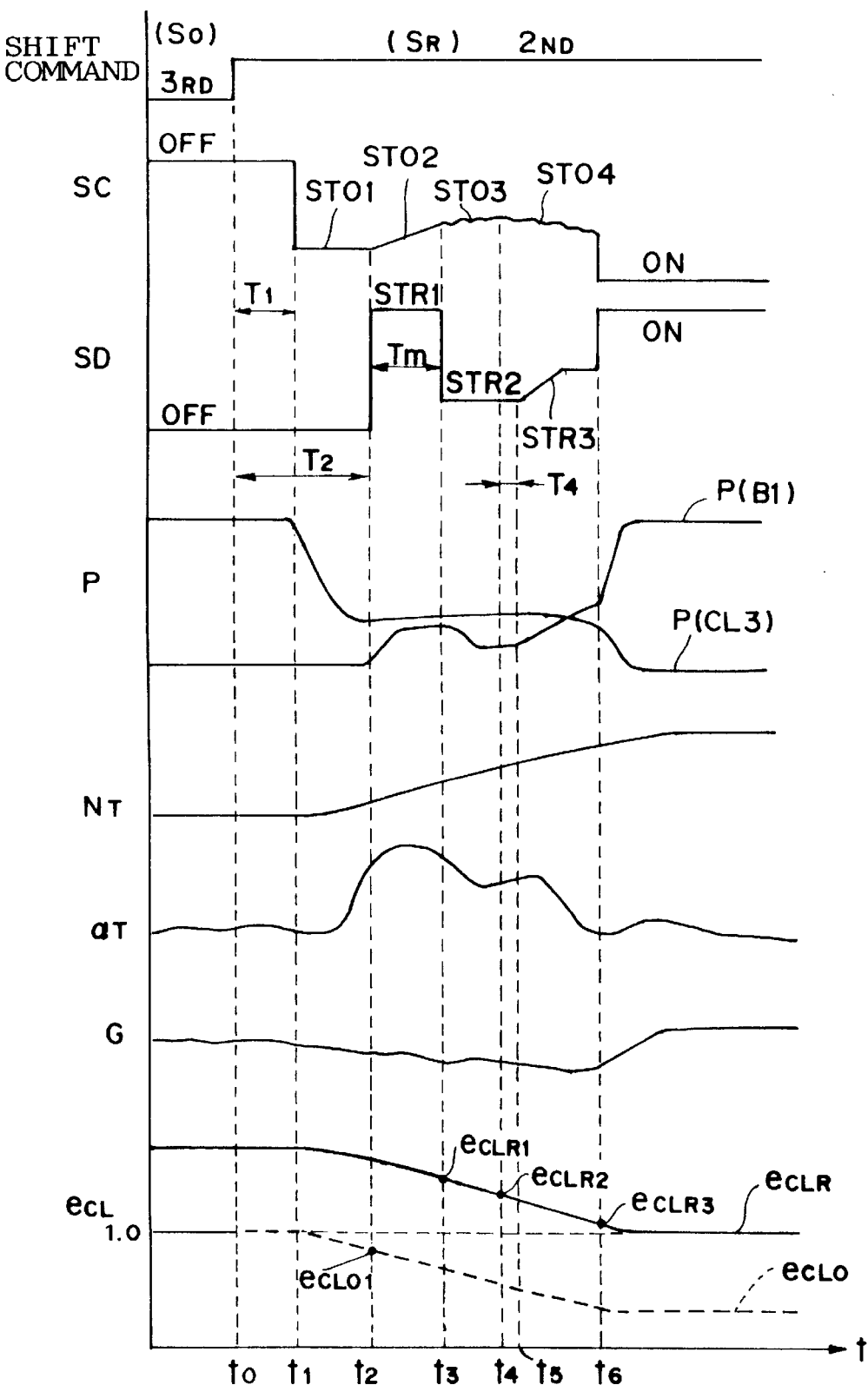
FIG. 7 is a chart showing chronological changes of various parameters while a shift down control is carried out in accordance with the shift control method.

The shift-down control S3 and shift-up control S4 are described in detail in the following. First, the shift-down control is described with reference to a timing chart in FIG. 7 and flowcharts in FIGS. 8 and 9.

Figure 8:
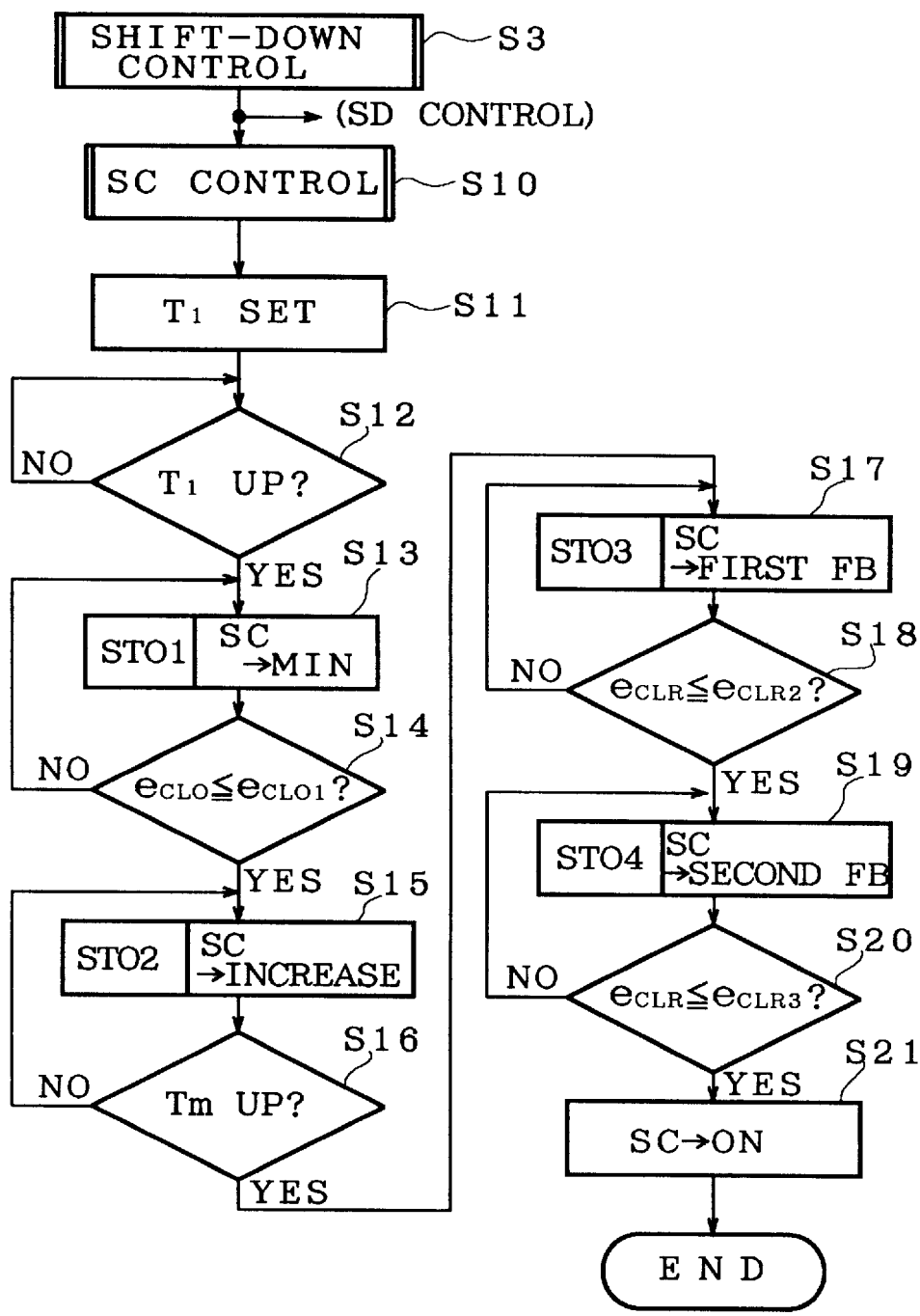
FIG. 8 is a flowchart showing processes which are effected during the shift down control.
Figure 9:
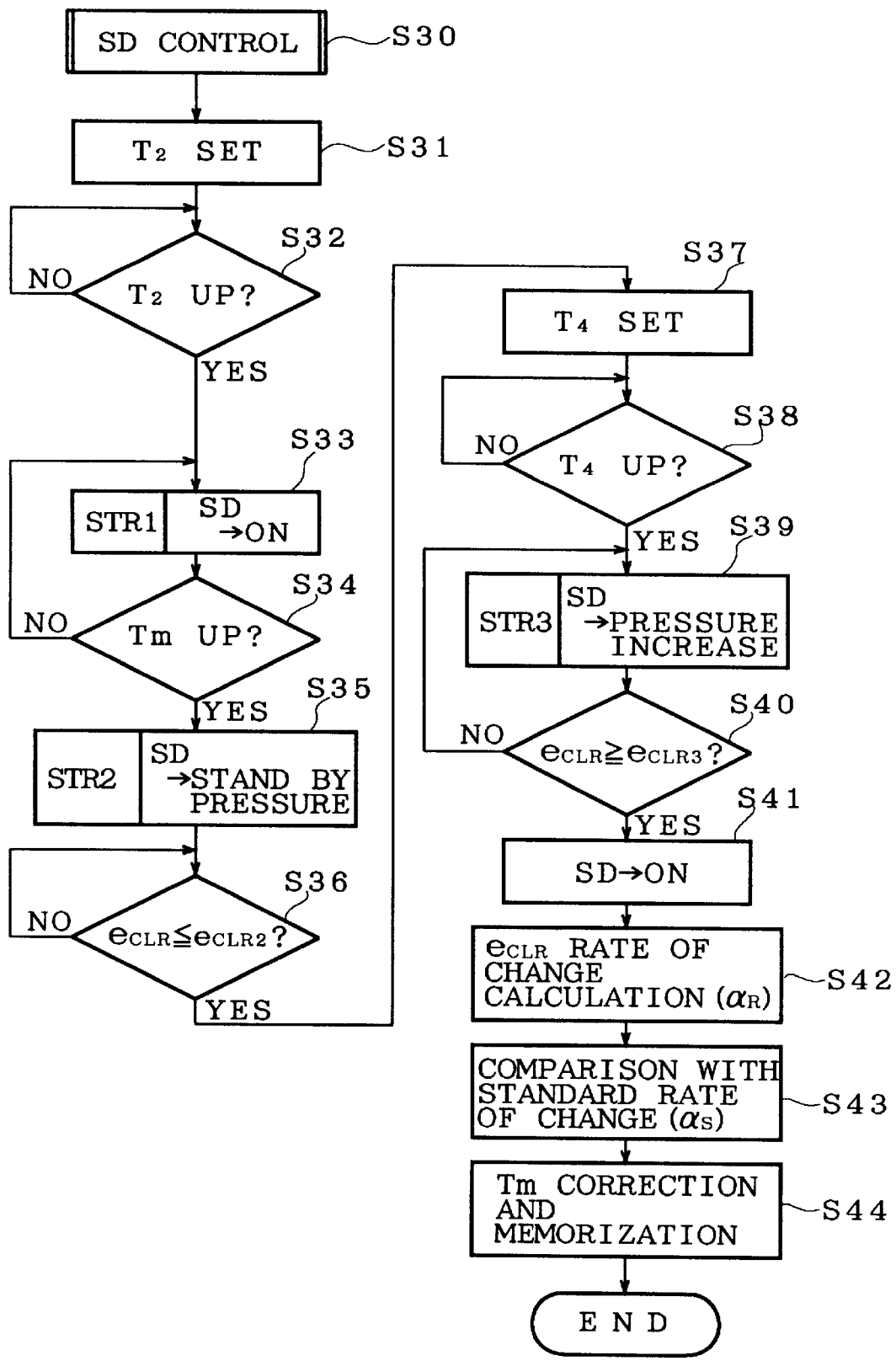
FIG. 9 is another flowchart showing other processes which are effected during the shift down control.

The shift-down control is carried out in accordance with the flowcharts of FIGS. 8 and 9. Here, a description is made for a case that a command for shifting down from the 3RD speed range to 2ND speed range is generated at time t0 as shown in the timing chart of FIG. 7. This timing chart also describes chronological changes in the pressures P(CL3) and P(B1) of the third clutch CL3 and first brake B1, the rotational speed NT and acceleration αT of the turbine of the torque converter and the acceleration G of the vehicle.

Here, the power is on, and the solenoid valve SC for establishing the 3RD speed range (off-going speed range) and the solenoid valve SD for establishing the 2ND speed range (on-coming speed range) are controlled in this shift-down control. The timing chart includes pressure command signals SC and SD for setting the solenoid valves SC and SD on or off or at duty cycles. The solenoid valve SC is of a normally open type, so it fully opens when its solenoid is turned off. On the other hand, the solenoid valve SD is of a normally closed type, so it fully opens when its solenoid is turned on.

FIG. 8 describes the control flow of the solenoid valve SC, i.e., the pressure control flow of the off-going engaging element (see step S10). Here, immediately after the shift-down command is generated, counting starts for a predetermined time period T1 (steps S11 and S12). At the same time, in the control flow of the solenoid valve SD shown in FIG. 9, i.e., the pressure control flow of the on-coming engaging element (step S30), immediately after the shift-down command is generated, counting starts for a predetermined time period T2 (>T1) (steps S31 and S32). In this instance, the rotational speed NT of the turbine increases as shown in the figure because of the power-on condition.

When the elapse of the predetermined time period T1 is determined at step S12 in the control flow for the solenoid SC (time t1), the control flow proceeds to step S13 to start an off-going range releasing stage STO1. During this off-going range releasing stage STO1, the solenoid valve SC is controlled at a duty cycle very close to the ON condition as shown in the timing chart. As a result, the solenoid valve SC attains a large opening. The engagement-actuating pressure P(CL3) of the third clutch CL3, which has been in complete engagement, rapidly decreases to a releasing pressure, i.e., to a minimum pressure. As the engaging force of the third clutch CL3 weakens rapidly, the clutch CL3 starts slipping. Thus, the rotational speed NT of the turbine increases gradually.

In the control apparatus, the input/output rotational speed ratio eCLO of the third clutch CL3 (on-going engaging element) and the input/output rotational speed ratio eCLR of the first brake B1 (on-coming engaging element) are calculated from the values detected by the input and output rotation sensors 9a and 9b and the gear ratio of the 2ND speed range. These input/output rotational speed ratios correspond to the rates of slippage in the off-going engaging element (third clutch CL3) and the on-coming engaging element (first brake B1). When the input/output rotational speed ratios are 1.0, the rates of slippage are nil.

As the third clutch CL3 starts slipping, the input/output rotational speed ratio eCLO of the off-going engaging element, i.e., the input/output rotational speed ratio of the third clutch CL3, decreases gradually from 1.0 (i.e., the rate of slippage of the off-going engaging element increases gradually). When the input/output rotational speed ratio eCLO of the off-going engaging element is judged smaller than a first predetermined value eCLO1 at step S14 (i.e., the rate of slippage is judged as have increased to a first rate of slippage), the control flow proceeds to a torque-increasing stage STO2 (step S15), and the solenoid valve SC is controlled at a duty cycle in such a way that the engagement pressure of the third clutch CL3 increases little by little, very gradually, from the releasing pressure.

On the other hand, when the elapse of the predetermined time period T2 is determined at step S32 in the control flow for the solenoid valve SD (time t2), the control flow proceeds to step S33 to start an on-coming range void-stroke-clearing stage STR1. During this on-coming range void-stroke-clearing stage STR1, the solenoid valve SD is turned on and opens fully as shown in the timing chart. As a result, the line pressure is rapidly supplied to the first brake B1, which has been in released condition, and the void stroke of the first brake B1 is quickly cleared. As seen from the timing chart, the predetermined time period T2 is set to a time at which the input/output rotational speed ratio eCLO of the off-going engaging element becomes smaller than the first predetermined value eCLO1 set for the off-going engaging element. Therefore, instead of judging the elapse of the predetermined time period T2, the on-coming range void-stroke-clearing stage STR1 at step S33 may be started when the input/output rotational speed ratio eCLO of the off-going engaging element becomes smaller than the first predetermined value eCLO1.

Figure 10:
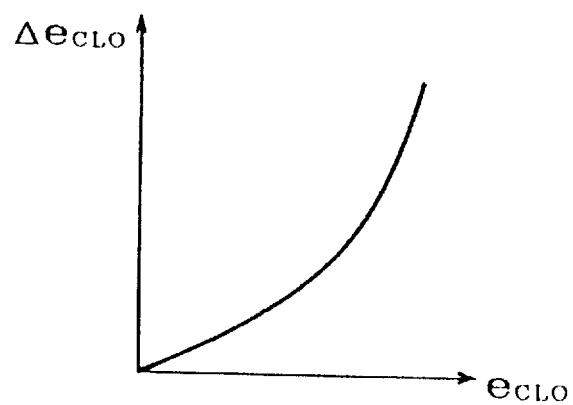
FIG. 10 is a chart showing the relation between the input/output rotational speed ratio and a target rate of change of the input/output rotational speed ratio of the off-going engaging element in this shift-down control.

Then, when the elapse of the time period Tm set for clearing the void stroke of the on-coming engaging element is determined at step S16 (time t3), the control flow of the solenoid valve SC proceeds to a first feedback stage STO3 at step S17. During this first feedback stage STO3, a target rate of change ΔeCLO is set for the input/output rotational speed ratio eCLO of the third clutch CL3, and the duty cycle of the solenoid valve SC is controlled to attain this target rate of change ΔeCLO of the input/output rotational speed ratio in feedback control. Relations between the input/output rotational speed ratio eCLO of the third clutch CL3 and the target rate of change ΔeCLO are preset as shown in FIG. 10.

In the same way, when the elapse of the time period Tm set for clearing the void stroke of the on-coming engaging element is determined at step S34 (time t3), the control flow of the solenoid SD proceeds, from step S34 to step S35, to an on-coming range waiting stage STR2. During this on-coming range waiting stage STR2, the engagement-actuating pressure of the first brake B1 is set to a pressure necessary for the brake to be in standby condition before starting engagement, i.e., to a pressure a little lower than a pressure to start engagement (hereinafter this pressure is referred to as "imminent standby pressure").

When the input/output rotational speed ratio eCLR of the first brake B1 becomes a second predetermined value eCLR2 set for the on-coming engaging element, the control flow of the solenoid SC proceeds, from step S18 to step S19, to a second feedback stage STO4. During this stage, the solenoid valve SC is controlled through feedback to attain a target value which is set to the target rate of change ΔeCLO of the input/output rotational speed ratio attained during the first feedback stage STO3 just before the control proceeds to the second feedback stage STO4.

On the other hand, in the control of the solenoid valve SD, when the input/output rotational speed ratio eCLR of the first brake B1 is determined to have become the predetermined value eCLR2 set for the on-coming engaging element at step S36, after waiting for the elapse of a fourth predetermined time period T4 in steps S37 and S38, the control flow proceeds to step S39, to an on-coming range engagement control stage STR3. During this on-coming range engagement control stage STR3, the pressure of the first brake B1 is controlled so as to increase gradually from the imminent standby pressure to a predetermined pressure. As a result, the first brake B1, which has been in standby condition, waiting for engagement, starts engaging gradually.

When the input/output rotational speed ratio eCLR of the first brake B1 becomes a third predetermined value eCLR3 set for the on-coming engaging element, i.e., a value which corresponds to a rate of slippage used for judging the engagement, the control flow for the solenoid valve SC proceeds from step S20 to step S21 to turn the solenoid valve SC on, and the control flow for the solenoid valve SD proceeds from step S40 to step S41 to turn the solenoid valve SD on also. As a result, the first brake B1 engages completely, and the third clutch CL3 is released completely. In this way, the power-on shift-down from the 3RD speed range to the 2ND speed range is carried out by releasing the third clutch CL3 and engaging the first brake B1.

As shown in FIG. 9, in the control flow for controlling the solenoid valve SD, after the solenoid valve SD is turned on, the rate of change αR of the input/output rotational speed ratio eCLR of the first brake B1 is calculated during the engagement control of the first brake B1 (on-coming engaging element), i.e., during the on-coming range engagement control stage STR3 (during a control stage while the engagement is still weak) at step S42. This rate αR is the rate of change of the input/output rotational speed ratio eCLR over a period between time t5 and time t6 in FIG. 7, and it is compared with the standard rate of change αS at step S43. Based on the result of this comparison, the time period Tm set for clearing the void stroke is corrected at step S44. For example, if αR>αS, then the time period Tm spent for clearing the void stroke in the last shift control can be judged as unduly long, and a correction is made to shorten the time. This corrected time is memorized as the time to be set for clearing the void stroke in a next shift control.

Figure 11:
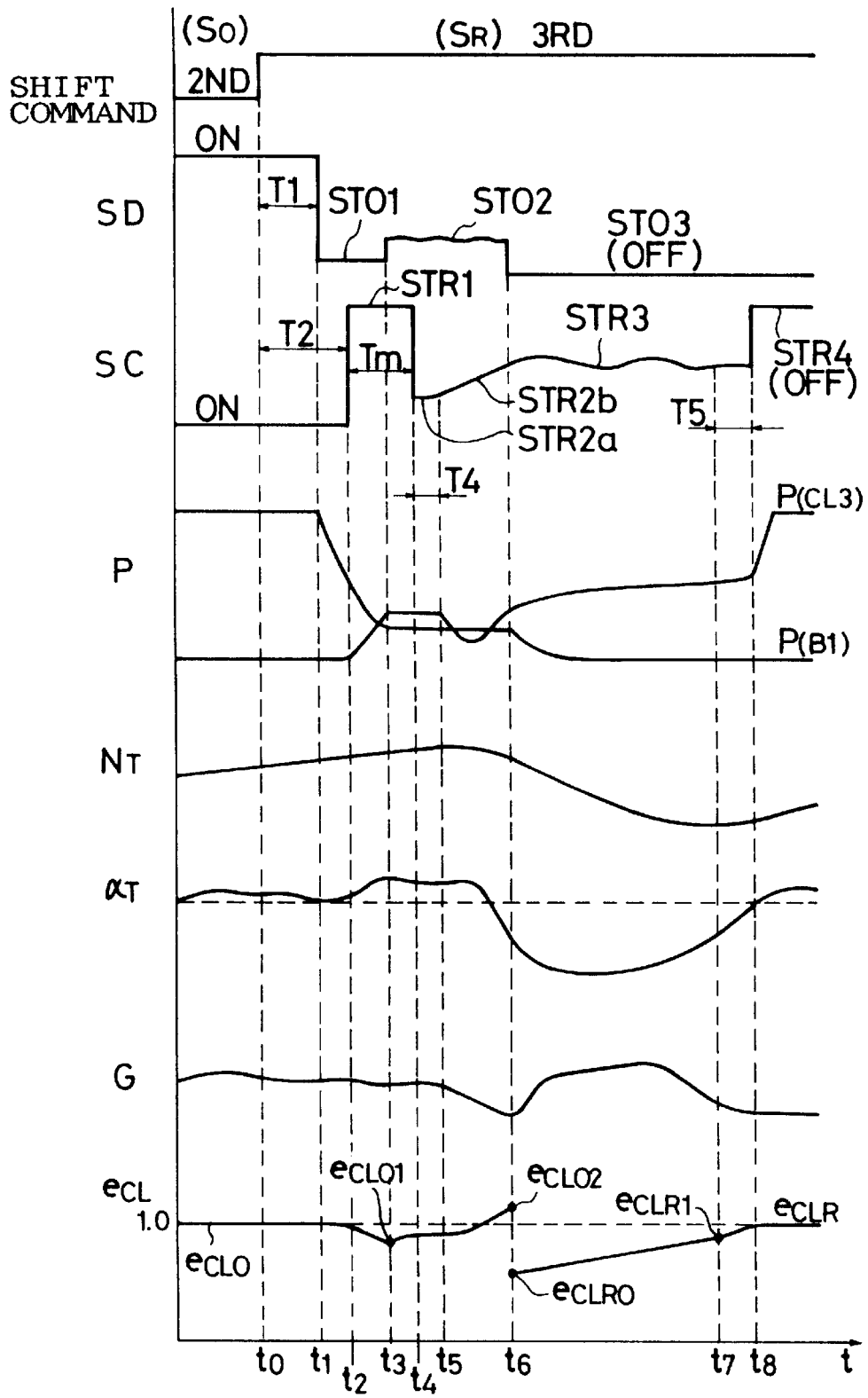
FIG. 11 is a chart showing chronological changes of various parameters while a shift-up control is carried out in accordance with the shift control method.
Figure 12:
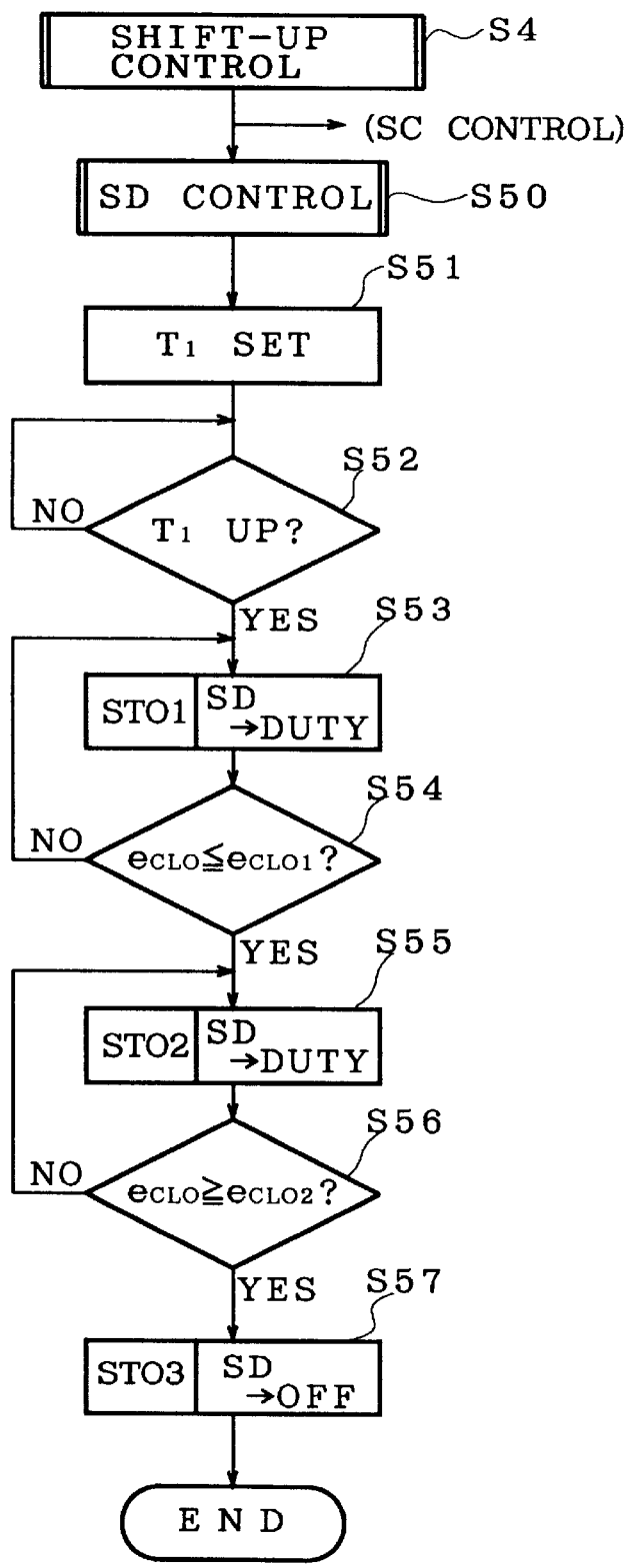
FIG. 12 is a flowchart showing processes which are effected during the shift-up control.

Now, a shift control for a case of shifting up is described with reference to a timing chart in FIG. 11 and flowcharts in FIGS. 12 and 13. Here, an example is presented to describe the shift-up control in power-on condition. As shown in the timing chart, a command for shifting up from the 2ND speed range to the 3RD speed range is generated at time t0.

In this shift-up control, the solenoid valve SD establishing the 2ND speed range (off-going speed range) and the solenoid valve SC to establish the 3RD speed range (on-coming speed range) are controlled. In the control flow (step S50) for the solenoid valve SD shown in FIG. 12, immediately after the shift-up command has been generated, counting starts for a predetermined time period T1 at step S51. At the same time, in the control flow (step S60) for the solenoid valve SC shown in FIG. 13, immediately after the shift-up command is generated, counting starts for a predetermined time period T2 (>T1) at step S61. During these time periods, the rotational speed NT of the turbine increases because of the power-on condition.

When the elapse of the predetermined time period T1 is determined at step S52 in the control flow for the solenoid valve SD (time t1), the control flow proceeds to step S53 to start an off-going range first stage STO1. During this off-going range first stage STO1, the solenoid valve SD is controlled at a low duty cycle as shown in the timing chart. As a result, the engagement-actuating pressure P0 (hereinafter referred to only as "pressure") of the first brake B1, which has been in complete engagement, rapidly decreases, and the engaging force thereof weakens to allow some slipping. Therefore, the rotational speed NT of the turbine increases a little (to a degree at which engine racing is not allowed) from the rotational speed which has been attained without any slip in the first brake B1 (refer to the rotational acceleration αT of the turbine).

On the other hand, in the control flow for the solenoid valve SC, when the elapse of the predetermined time period T2 is determined (time t2) at step S62, the control flow proceeds to step S63 to start an on-coming range first stage STR1. During this on-coming range first stage STR1, the solenoid valve SC is turned off as shown in the timing chart. As a result, the line pressure is supplied to the third clutch CL3, which has been in disengagement, and the pressure PR thereof increases to clear the void stroke of the third clutch CL3 quickly.

While the void stroke of the third clutch CL3 is being cleared, the input/output rotational speed ratio eCLO of the first brake B1 becomes gradually small. When this ratio eCLO is determined smaller than a first predetermined value eCLO1 (<1.0) at step S54 (time t3), the control flow for the solenoid valve SD proceeds to step S55 to execute an off-going range second stage STO2. During this off-going range second stage STO2, an actual input/output rotational speed ratio eCLO is fed back to calculate a pressure value necessary for adjusting the first brake B1 so as to achieve a target input/output rotational speed ratio. The solenoid valve SD is then controlled at a duty cycle which corresponds to this calculated pressure value.

The above target input/output rotational speed ratio is selected in such a way that the input/output rotational speed ratio eCLO of the first brake B1 is kept within a predetermined range which is closer to 1.0 (a range whose lower limit is defined by an input/output rotational speed ratio a little greater than the first predetermined value eCLO1). Thereby, the first brake B1 is kept slightly slipping, i.e., having a torque transmission capacity almost equivalent to the input torque. Therefore, while the off-going range second stage STO2 is carried out, the rotational speed NT of the turbine, i.e., the rotational speed of the engine, is prevented from racing.

On the other hand, in the control of the solenoid valve SC, when the time period Tm set for clearing the void stroke at the start of the on-coming range first stage STR1 (stage for clearing the void stroke) is determined to have elapsed (time t4), the control flow proceeds from step S64 to step S65 and starts counting for a predetermined time period T4. Then, the control flow proceeds to step S66 to execute an on-coming range second anterior stage STR2a. By this time, the void stroke of the third clutch CL3 has been almost cleared, and the third clutch CL3 is about to start engaging, or it is in preliminary engagement in which very little torque is transmitted.

During this on-coming range second anterior stage STR2a, the duty cycle of the solenoid valve SC is increased to set the pressure PR of the third clutch CL3 to a pressure with which the third clutch CL3 is kept in preengagement condition or preliminary engagement condition.

When the elapse of the predetermined time period T4 is determined at step S67 (time t5), the control flow for the solenoid valve SC proceeds to step S68 to execute an on-coming-range second posterior stage STR2b. During this on-coming-range second posterior stage STR2b, the duty cycle of the solenoid valve SC is gradually reduced from the duty cycle set for the on-coming range second anterior stage STR2a so that the pressure PR of the third clutch CL3 is gradually increased at a constant rate from the pressure value set for retaining the third clutch CL3 in the preengagement condition or preliminary engagement condition.

In this way, the input/output rotational speed ratio eCLO of the first brake B1 gradually approaches 1.0. When the pressure PR of the third clutch CL3 has attained a certain pressure, the rotational speed NT of the turbine declines substantially. However, the output rotational speed does not decrease as much because of inertia, so the input/output rotational speed ratio eCLO of the first brake B1 exceeds 1.0. At this moment, the acceleration G of the vehicle changes a little.

When the input/output rotational speed ratio eCLO is determined equal to or greater than a second predetermined value eCLO2 (>1.0) at steps S56 and S69 (time t6), the control flows proceed to step S57 and to step S70, respectively. At step S57, the solenoid valve SD is controlled for an off-going range final stage STO3. During this off-going range final stage STO3, the solenoid valve SD is turned off to release the first brake B1.

On the other hand, at step S70, the control flow for the solenoid valve SC proceeds to an on-coming range third stage STR3. During this on-coming range third stage STR3, the solenoid valve SC is controlled at a duty cycle in such a way that the input/output rotational speed ratio eCLR of the third clutch CL3 approaches 1.0 at a constant rate. Therefore, the pressure PR of the third clutch CL3 increases gradually, and the rotational speed NT of the turbine decreases gradually.

When the input/output rotational speed ratio eCLR of the third clutch CL3 is determined greater than a predetermined value eCLR1 at step S71 (time t7), the control flow for the solenoid valve SC proceeds to step S72 to start counting for a predetermined time period T5. While this counting is being carried out, the on-coming range third stage STR3 is continued. When the elapse of the predetermined time period T5 is determined at step S73, the control flow proceeds to step S74 to execute an on-coming range final stage STR4. During this on-coming range final stage STR4, the solenoid valve SC is turned off to completely engage the third clutch CL3 (time t8).

The shift from the 2ND speed range to the 3RD speed range in power-on condition completes as described above.

Figure 13:
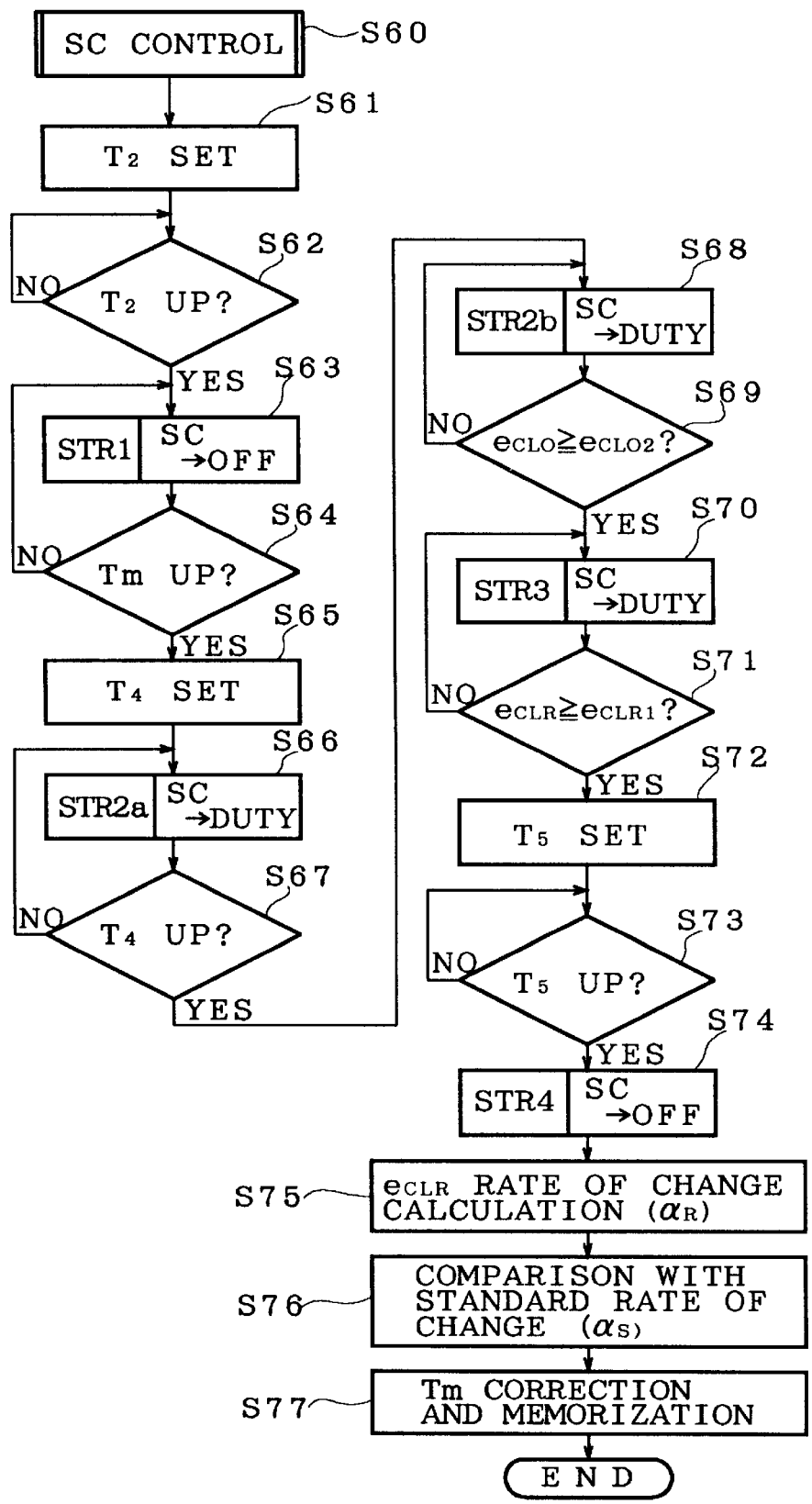
FIG. 13 is another flowchart showing other processes which are effected during the shift-up control.

As shown in FIG. 13, in the flow for controlling the solenoid valve SC, after the solenoid valve SC is turned off, the rate of change αR of the input/output rotational speed ratio eCLR of the third clutch CL3 is calculated during the engagement control of the third clutch CL3 (on-coming engaging element) (while the engagement is still weak) at step S75. This rate αR is compared with the standard rate of change αS at step S76. Based on the result of this comparison, the time period Tm set for clearing the void stroke is corrected at step S77.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shift control method for an automatic transmission which includes a plurality of power transmission paths provided between input and output members, a plurality of engaging elements for selectively establishing said power transmission paths, and engagement-controlling means for controlling engagement-actuation pressures of said engaging elements in response to pressure command signals; said engagement-controlling means carrying out a shift control from an off-going range to an on-coming range by releasing an off-going engaging element and engaging an on-coming engaging element among said plurality of engaging elements in response to a shift command signal; said method comprising the steps of:

lowering the engagement-actuation pressure of said off-going engaging element during an off-going range releasing stage to release said off-going engaging element in response to said shift command signal;

setting the engagement-actuation pressure of said on-coming engaging element at a predetermined high-pressure for a predetermined time period after said shift command signal is generated during an on-coming range void-stroke-clearing stage, therein clearing a void stroke of said on-coming engaging element; and controlling engaging operation of said on-coming engaging element during an on-coming range engaging stage after completion of said on-coming range void-stroke-clearing stage;

wherein:

based on condition of the engaging operation of said on-coming engaging element during said on-coming range engaging stage, correcting said predetermined time period of said on-coming range void-stroke-clearing stage for a next shift operation, and wherein based on changes in a rate of slippage of said on-coming engaging element during said on-coming range engaging state, correcting said predetermined time period of said on-coming range void-stroke-clearing stage for a next shift operation.

2. The shift control method as set forth in claim 1 wherein:

said on-coming range engaging stage is a stage during which said on-coming engaging element is engaged weakly, and said on-coming range engaging stage is followed by an on-coming range final stage during which said on-coming engaging element is engaged completely.

3. A shift control method for an automatic transmission which includes a plurality of power transmission paths provided between input and output members, a plurality of engaging elements for selectively establishing said power transmission paths, and engagement-controlling means for controlling engagement-actuation pressures of said engaging elements in response to pressure command signals; said engagement-controlling means carrying out a shift control from an off-going range to an on-coming range by releasing an off-going engaging element and engaging an on-coming engaging element among said plurality of engaging elements in response to a shift command signal; said method comprising the steps of:

lowering the engagement-actuation pressure of said off-going engaging element during an off-going range releasing stage to release said off-going engaging element in response to said shift command signal;

setting the engagement-actuation pressure of said on-coming engaging element at a predetermined high-pressure for a predetermined time period after said shift command signal is generated during an on-coming range void-stroke-clearing stage, therein clearing a void stroke of said on-coming engaging element; and controlling engaging operation of said on-coming engaging element during an on-coming range engaging stage after completion of said on-coming range void-stroke-clearing stage;

wherein:

based on condition of the engaging operation of said on-coming engaging element during said on-coming range engaging stage, correcting said predetermined time period of said on-coming range void-stroke-clearing stage for a next shift operation, and wherein based on a rate of change of an input/output rotational speed ratio of said on-coming engaging element during said on-coming range engaging state, correcting said predetermined time period of said on-coming range void-stroke-clearing stage for a next shift operation; and wherein if the rate of change of the input/output rotational speed ratio of said on-coming engaging element during said on-coming range engaging stage is smaller than a standard rate of change, making said predetermined time period longer; and if the rate of change of the input/output rotational speed ratio of said on-coming engaging element during said on-coming range engaging stage is greater than the standard rate of change, making said predetermined time period shorter.

4. The shift control method as set forth in claim 1, 2 or 3 wherein:

based on an operational time of said on-coming range engaging stage, correcting said predetermined time period of said on-coming range void-stroke-clearing stage for a next shift operation.

5. The shift control method as set forth in claim 4 wherein:

if the operational time of said on-coming range engaging stage is longer than a standard time period, making said predetermined time period longer; and if the operational time of said on-coming range engaging stage is shorter than the standard time period, making said predetermined time period shorter.

\* \* \* \* \*